No. 755,475. PATENTED MAR. 22, 1904.
J. E. FILLMAN & W. DAVIS.
COUPLING FOR DOUBLETREES.
APPLICATION FILED OCT. 28, 1903.

NO MODEL. 2 SHEETS—SHEET 1.

Witnesses
Wm. J. Koerth
O. G. Heylmun

Inventors
John E. Fillman
William Davis,
By Victor J. Evans
Attorney

THE NORRIS PETERS CO., PHOTO-LITHO., WASHINGTON, D. C.

No. 755,475. PATENTED MAR. 22, 1904.
J. E. FILLMAN & W. DAVIS.
COUPLING FOR DOUBLETREES.
APPLICATION FILED OCT. 28, 1903.
NO MODEL. 2 SHEETS—SHEET 2.
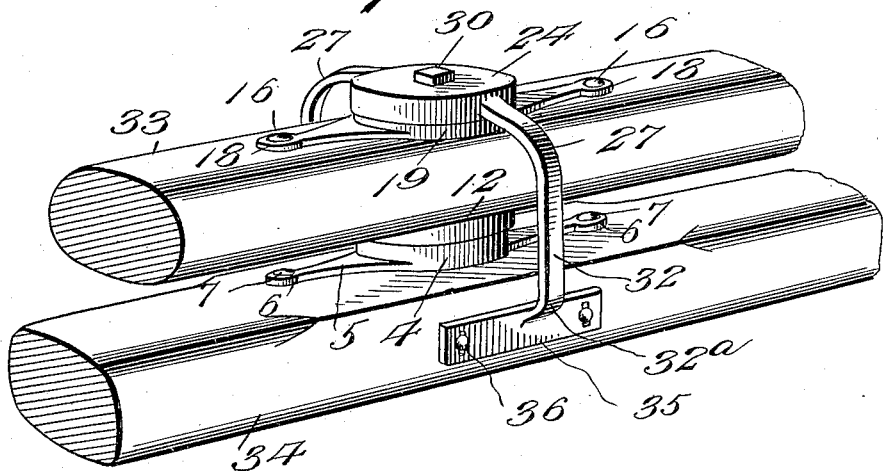
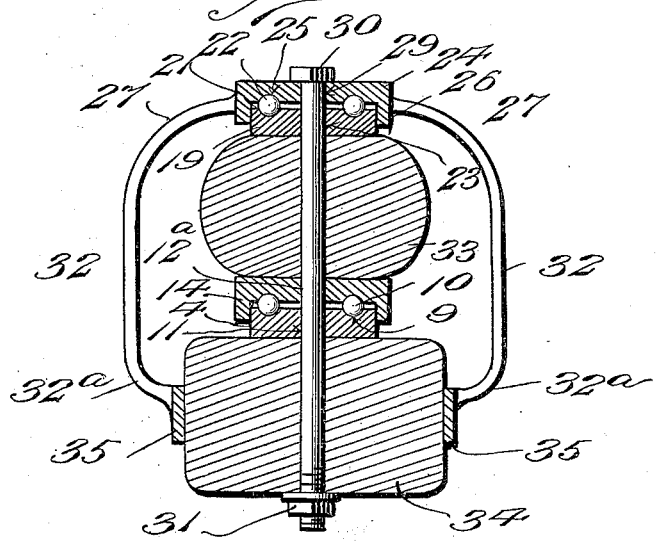
Inventors
John E. Fillman,
William Davis,
By Victor J. Evans
Attorney
Witnesses No. 755,475. Patented March 22, 1904.

UNITED STATES PATENT OFFICE.

JOHN E. FILLMAN AND WILLIAM DAVIS, OF MENO, OKLAHOMA TERRITORY.

COUPLING FOR DOUBLETREES.

SPECIFICATION forming part of Letters Patent No. 755,475, dated March 22, 1904.

Application filed October 28, 1903. Serial No. 178,899. (No model.)

*To all whom it may concern:*

Be it known that we, JOHN E. FILLMAN and WILLIAM DAVIS, citizens of the United States, residing at Meno, in the county of Woods and Territory of Oklahoma, have invented new and useful Improvements in Couplings for Doubletrees, of which the following is a specification.

Our invention has relation to new and useful improvements in couplings for whiffle and double trees of that character or type employed for the purpose of connecting a doubletree to a wagon-pole or a swingletree to a cross-bar or to a doubletree.

The object of the invention is to provide a coupling which is simple in construction, durable and effective in use, and which will embody in its structure a reliable and efficient means for preventing the bending or breaking of the pivot-bolt by which the coupling members are held in assembled position.

The invention consists in the novel construction of the various elements comprising the invention and their arrangement in operative combination, the novelty of which will be more fully described hereinafter, particularly pointed out, and distinctly claimed.

We have fully and clearly illustrated our invention in the accompanying drawings, forming a part of this specification, and wherein—

Figure 1:
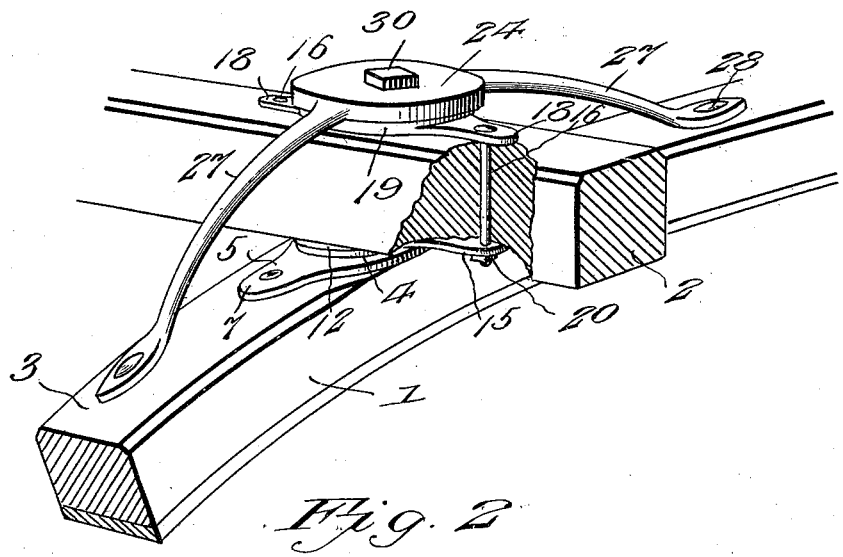
Figure 2:
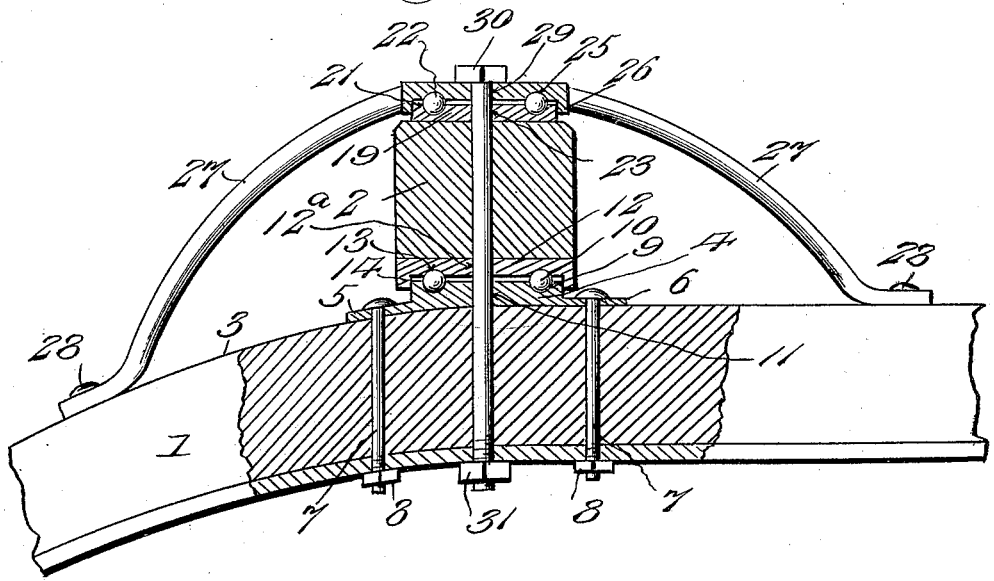

Figure 1 is a perspective view of a section of a vehicle-pole and a doubletree which are connected or coupled by means of our improved coupling. Fig. 2 is a view of the invention as applied in operative position, the pole being shown partly in longitudinal section and the doubletree in transverse section. Fig. 3 is a detail perspective view of portions of a whiffletree and doubletree, showing the features of the invention applied thereto. Fig. 4 is a transverse vertical section through the center of the devices shown by Fig. 3.

Referring to the drawings, particularly Figs. 1 and 2, wherein the invention is shown as employed for the purpose of coupling a doubletree to a pole, 1 designates a vehicle-pole, which may be of any of the approved and well-known constructions, and 2 is the doubletree, which is arranged transversely of the pole, being connected or coupled thereto by the improved coupling embodying our invention.

As above stated, the vehicle-pole may be of any construction; but the upper face or surface thereof is preferably made flat, as at 3. Upon this upper flat surface of the pole is arranged a bearing-plate 4, the body of said plate being preferably circular in contour and provided with forwardly and rearwardly extending radial securing-ears 5 6, said plate and ears being disposed flat upon the pole and secured in position thereon by headed bolts 7, projected through said ears and extending downwardly through and beyond the pole, where they are secured by means of nuts 8, as shown in Fig. 2.

In the upper face of the plate 4 and adjacent the margin thereof is formed an annular groove or channel 9, constituting a raceway, in which are disposed bearing-balls 10, and said plate is also formed with a central aperture 11, through which the pivot-bolt passes when the doubletree and pole are coupled.

12 designates a circular bearing-plate arranged upon the under side of the doubletree and at a point centrally of the ends thereof. This plate is formed with an annular raceway 13, which coincides with the raceway in the plate 4 and in which the upper surfaces of the bearing-balls 10 are seated, said plate being also formed with an annular depending flange 14, which surrounds and extends well below the circular plate 4 and serves to exclude the dust from the bearing-balls and raceways.

Extending radially from the plate 12 and diammetrically opposite each other are apertured ears 15, through which are passed fastening-bolts 16, said bolts 16 being projected downwardly through similar alining ears 18, formed upon an upper bearing-plate 19, which is arranged upon the upper side of the doubletree. These bolts are secured in position by means of nuts 20, threaded onto their lower ends and engaging the ears on the plate 12.

The plate 19 just mentioned is provided with an annular ball-race 21, in which are arranged bearing-balls 22, and with a central aperture 23, said aperture being in vertical alinement with the aperture 12ª and also the aperture 11 in the plate 4.

24 designates a cap-piece which is preferably, but not necessarily, circular in form and is formed with a raceway 25, coinciding with the raceway to receive the bearing-balls 22. Said cap-piece 24 is also provided with an annular depending flange 26, which hangs below the upper face of the plate 19 for the purpose of protecting the bearings between said cap-piece and the plate 19.

Extending from the cap-piece 24 are forwardly and rearwardly projecting radial arms 27, the end portions of which are curved downwardly and secured to the pole 1, as at 28, at points at front and rear of the doubletree. This cap-piece is also formed with a central aperture 29, through which is projected the pivot-bolt 30, which bolt extends downwardly through the doubletree, the pole, and the bearing-plates mounted thereon, said bolt projecting below the under side of the pole and being secured in position by means of a nut 31, as shown in Fig. 2.

In Figs. 3 and 4 we have shown the invention as employed for the purpose of pivotally uniting or coupling a whiffletree to a doubletree or cross-bar. In the figures just mentioned the structure and arrangement of the various elements of the coupling are substantially the same and operate the same as those shown in Figs. 1 and 2 and are designated by the same reference-numerals, with the exception of the arms 27, with which the cap-piece 24 is provided. As shown in Figs. 3 and 4, these arms 27 are slightly altered in form, being carried but a short distance in opposite directions from the cap-piece 24, where they are directed downwardly, as at 32, and arranged a sufficient distance from the swingletree 33 and cross-bar or doubletree 34 to provide for the unobstructed movement of the single or whiffle tree on its pivot. The lower terminals of the downwardly-projecting portions 32 of the arms 27 at a point opposite the cross-bar 34 are turned inwardly toward said bar, as at 32ª, and each is provided with a horizontally-disposed securing-plate 35, which projects on either side of said arms and are formed with vertically-arranged slots adapted to receive fastening-screws 36, the slots providing for the vertical adjustment of the arms and plates in order to increase or diminish the pressure of the cap-piece 24 on the bearing-balls 22.

It will be seen that the construction of the cap-piece and the means for securing the same in position affords an efficient and reliable means for bracing the pivot-bolt and preventing the breaking thereof. It is well known that the bolt is most liable to break at the point between the pole and the doubletree, and that is due to the fact that the pull on the doubletree throws the upper end of the bolt forwardly, which bends and consequently weakens it at a point intermediate its ends. By the use of the cap-piece and arms 27 the upper end of the bolt cannot be moved either forwardly or backwardly, which obviates the bending of the bolt and the consequent breakage thereof.

Having thus fully described the invention, what we claim as new is—

1. In a coupling of the class set forth, the combination with two parts adapted to be connected by the coupling, one of said parts being superposed over the other, a pivot-bolt extending vertically through the said parts, antifrictional devices interposed between the parts and also having the pivot-bolt passing centrally therethrough, an upper bearing-plate secured to the upper side of the top part, a cap fitted over said plate and having arms projecting from diametrically opposite points thereof and terminally attached to the lower part, the said arms clearing the opposite sides of the upper part, antifrictional devices being interposed between the cap and bearing-plate and the pivot-bolt passing centrally through both the bearing-plate and the cap.

2. In a coupling of the class set forth, the combination with a pole and a doubletree, of a bearing-plate on the pole, a plate on the doubletree formed with an angular flange surrounding said bearing-plate, bearing-balls between said plates, a bearing-plate on the upper side of the doubletree, a cap-piece fitted over the last-named plate and provided with oppositely-projecting arms terminally secured to opposite portions of the pole, bearing-balls between the plate on the upper side of the doubletree and the cap-piece, and a coupling-bolt passing through the doubletree and pole and the bearing-plate and cap-piece on the upper side of the doubletree, as well as the bearing-plates between the pole and the doubletree.

In testimony whereof we affix our signatures in presence of two witnesses.

JOHN E. FILLMAN.
WILLIAM DAVIS.

Witnesses:
CHAS. C. DE PUE,
S. A. FERREL.